(12) United States Patent
Panciroli et al.

(10) Patent No.: US 10,989,150 B2
(45) Date of Patent: Apr. 27, 2021

(54) METHOD TO CONTROL THE COMBUSTION OF AN INTERNAL COMBUSTION ENGINE

(71) Applicant: MARELLI EUROPE S.p.A., Corbetta (IT)

(72) Inventors: Marco Panciroli, Bologna (IT); Matteo De Cesare, Torremaggiore (IT); Riccardo Lanzoni, Imola (IT); Antonio Zito, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/835,534

(22) Filed: Mar. 31, 2020

(65) Prior Publication Data

US 2020/0309070 A1    Oct. 1, 2020

(30) Foreign Application Priority Data

Apr. 1, 2019   (IT) .......................... 102019000004879

(51) Int. Cl.
*F02B 47/08*    (2006.01)
*F02M 26/06*   (2016.01)
(Continued)

(52) U.S. Cl.
CPC .......... *F02M 26/06* (2016.02); *F02D 41/005* (2013.01); *F02D 41/2438* (2013.01); *F02P 5/06* (2013.01);
(Continued)

(58) Field of Classification Search
CPC ........ F02D 41/18; F02D 41/26; F02D 41/401; F02D 41/1454; F02D 41/2438;
(Continued)

(56) References Cited

U.S. PATENT DOCUMENTS

2015/0135680 A1* 5/2015 Ancimer ............... F02D 41/029
                                                              60/274
2017/0363028 A1   12/2017 Iwadare
(Continued)

FOREIGN PATENT DOCUMENTS

| EP | 1862670 A1 | 12/2007 |
|----|------------|---------|
| EP | 2514952 A1 | 10/2012 |
| WO | 2016132197 A1 | 8/2016 |

OTHER PUBLICATIONS

Search Report for Italian Patent Application No. 201900004879 dated Nov. 7, 2019.

(Continued)

*Primary Examiner* — John Kwon
(74) *Attorney, Agent, or Firm* — Howard & Howard Attorneys PLLC

(57) ABSTRACT

A method to control the combustion of an internal combustion engine comprising determining a combustion model providing a spark advance value depending on an objective value of a quantity representing the incidence of a low-pressure EGR circuit, of the rotation speed, of the intake efficiency and of an open-loop contribution of a combustion index; calculating a first closed-loop contribution of the spark advance depending on the combustion index; calculating a second closed-loop contribution of the spark advance depending on a quantity indicating the knocking energy; and calculating the objective value of the spark advance angle to be operated through the sum of the spark advance value provided by the combustion model and of the first closed-loop contribution or, alternatively, of the second closed-loop contribution.

15 Claims, 2 Drawing Sheets

(51) Int. Cl.
  *F02D 41/00* (2006.01)
  *F02D 41/24* (2006.01)
  *F02P 5/06* (2006.01)
  *F02P 5/152* (2006.01)
(52) U.S. Cl.
  CPC ....... *F02P 5/152* (2013.01); *F02D 2200/0411* (2013.01); *F02D 2200/101* (2013.01)
(58) Field of Classification Search
  CPC .. F02D 41/3836; F02D 35/023; F02D 35/028; F02D 2041/389; F02D 2041/0015; F02D 2200/06; F02D 37/02
  USPC ........................................ 123/568.11, 568.21
  See application file for complete search history.

(56) References Cited

U.S. PATENT DOCUMENTS

2017/0363037 A1  12/2017  Iwadare et al.
2020/0123991 A1* 4/2020  Panciroli .............. F02D 41/144

OTHER PUBLICATIONS

Cavina, Nicolo, et al., "Investigation of Water Injection Effects on Combustion Characteristics of a GDI TC Engine," SAE Int. J. Engines, vol. 10, No. 4, pp. 2209-2218 (Sep. 4, 2017) (XP055638814, Feb. 5, 2017).

* cited by examiner

METHOD TO CONTROL THE COMBUSTION OF AN INTERNAL COMBUSTION ENGINE

CROSS-REFERENCE TO RELATED APPLICATIONS

This patent application claims priority from Italian patent application no. 102019000004879 filed on Apr. 1, 2019, the entire disclosure of which is incorporated herein by reference.

TECHNICAL FIELD

The present invention relates to a method to control the combustion of an internal combustion engine.

PRIOR ART

As is known, in an internal combustion heat engine, in addition to fuel, water was also proposed to be fed to the combustion chambers defined inside the cylinders.

In an internal combustion engine, the water injection system consists in introducing water into the engine through the intake duct, in the form of a spray, or mixed with the fuel, or directly into the combustion chamber, in order to cool the air/fuel mixture, thus increasing resistance to knocking phenomena. Typically, the water feed system comprises a tank which is filled with demineralized water (to avoid scale formation). Normally, the tank is refilled from the outside of the vehicle or it could also be refilled by exploiting the condensation from the air conditioner, exploiting the condensation from the exhaust, or even by conveying rainwater. Furthermore, the tank is preferably provided with an electric heating device (i.e. provided with a resistance that generates heat by Joule effect when it is passed through by an electric current) which is used to melt any ice when the external temperature is particularly severe.

Water has high latent heat of vaporization, in other words it requires a lot of energy to pass from the liquid to the gaseous state. When water at room temperature is injected into the intake duct, it absorbs heat from the incoming air and the metal walls, evaporating, and therefore cooling the incoming charge. The engine therefore sucks cooler air, in other words denser air, the volumetric efficiency is improved and the possibility of knocking is reduced, and also more fuel can be injected. During compression, the water present in tiny drops evaporates and absorbs heat from the air that is being compressed, thereby cooling it and lowering its pressure. Combustion occurs after compression, providing a further beneficial effect: during combustion a lot of heat builds up, which is absorbed by the water, reducing the peak temperature of the cycle, consequently reducing the formation of NOx and the heat that must be absorbed by the engine walls. This evaporation also converts part of the engine heat (which would otherwise have been wasted) into pressure, precisely due to the vapour formed, increasing the thrust on the piston and also increasing any flow of energy entering a turbine to the exhaust (furthermore, the turbine would benefit from the reduction of the exhaust gas temperature due to the absorption of heat by the additional water).

However, still without compromising the thermodynamic efficiency, there is an increasing need to avoid the presence of an excessively bulky water feed system on board the vehicle.

DESCRIPTION OF THE INVENTION

Therefore, the object of the present invention is to provide a method to control the combustion of an internal combustion engine, which method is free from the drawbacks described above, and particularly, easy and inexpensive to implement.

According to the present invention, a method to control the combustion of an internal combustion engine is provided, as claimed in the appended claims.

BRIEF DESCRIPTION OF THE DRAWINGS

The present invention will now be described with reference to the accompanying drawings, which illustrate a non-limiting embodiment thereof, in which.

PREFERRED EMBODIMENTS OF THE INVENTION

Figure 1:
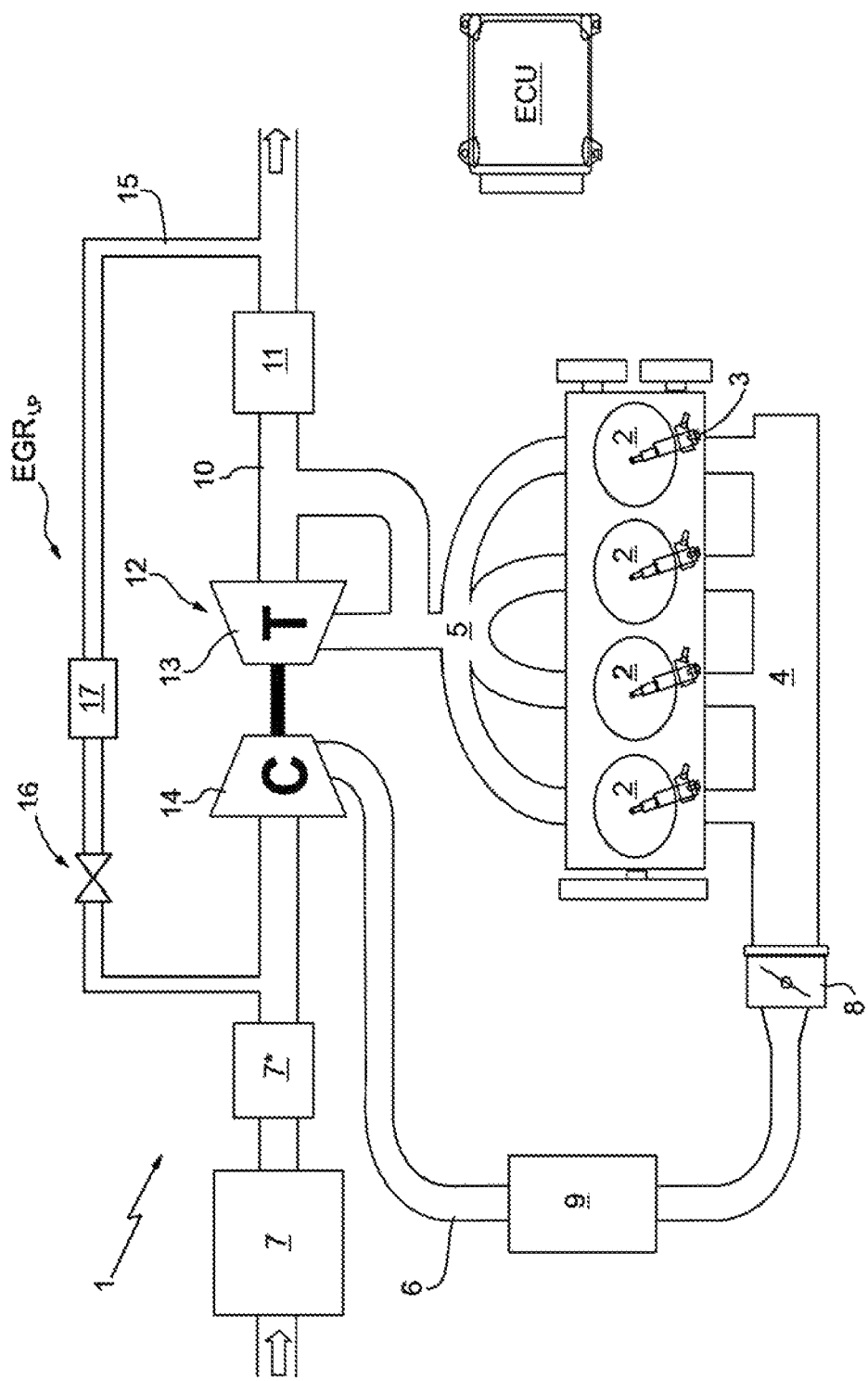
FIG. 1 is a schematic view of an internal combustion engine provided with an electronic control unit which implements the combustion control method object of the present invention.

In FIG. 1, number 1 indicates, as a whole, an internal combustion engine for a road vehicle—car or motorcycle—(not shown) provided with a number (in particular, four) of cylinders 2, in which respective variable volume combustion chambers and four injectors 3 are defined, which injectors inject the fuel, preferably petrol, directly into the cylinders 2, each of which is connected to an intake manifold 4 via at least one respective intake valve (not shown) and to an exhaust manifold 5 via at least one respective exhaust valve (not shown).

The intake manifold 4 receives a gas mixture comprising both exhaust gas (as better described below) and fresh air, i.e. air coming from the external environment through an intake duct 6, which is provided with an air filter 7 for the flow of fresh air and is controlled by a throttle valve 8. A mass flow sensor 7* (better known as the Air Flow Meter) is also arranged along the intake duct 6 downstream of the air filter 7.

An intercooler 9, whose function is to cool the intake air, is arranged along the intake duct 6 (preferably integrated into the intake manifold 4). The intercooler 9 is connected to a coolant conditioning circuit used in the intercooler 9 comprising a heat exchanger, a feed pump and a regulating valve arranged along a duct in parallel with the intercooler 9. The exhaust manifold 5 is connected to an exhaust duct 10 that feeds the exhaust gases produced by combustion to an exhaust system, which releases the gases produced by combustion into the atmosphere and normally comprises at least one catalyst 11 and at least one silencer (not shown) arranged downstream of the catalyst 11.

The supercharging system of the internal combustion engine 1 comprises a turbocharger 12 provided with a turbine 13, which is arranged along the exhaust duct 10 so as to rotate at high speed under the action of the exhaust gases expelled from the cylinders 3, and a supercharger 14, which is arranged along the intake duct 6 and is mechanically connected to the turbine 13 to be driven into rotation by the turbine 13 itself so as to increase the pressure of the air in the feed duct 6.

The internal combustion engine 1 is controlled by an ECU electronic control unit, which supervises the operation of all the components of the internal combustion engine 1.

According to a preferred variant, the internal combustion engine 1 lastly comprises a low-pressure $EGR_{LP}$ circuit which, in turn, comprises a bypass duct 15 originating from the exhaust duct 10, preferably downstream of the catalyst 11, and flowing into the intake duct 6, downstream of the air flow meter 7; the bypass duct 15 is connected in parallel to the turbocharger 12. An EGR valve 16 is arranged along the bypass duct 15, the former being suitable to adjust the flow rate of the exhaust gases flowing through the bypass duct 15. A heat exchanger 17, whose function is to cool the gases exiting the exhaust manifold 5 and entering the supercharger 14, is also arranged along the bypass duct 15, upstream of the valve 16.

The strategy implemented by the ECU electronic control unit to optimize combustion inside the internal combustion engine 1 is described below.

In particular, the following quantities are defined as:

$\eta_{ASP}$ intake efficiency (and represents the engine load or alternatively the indicated average pressure or the indicated driving torque or the driving brake torque) and is defined by the ratio between the mass of air trapped in the cylinder 2 for each combustion cycle $m_{AIR}$ and the mass of air trapped in the cylinder 2 for each combustion cycle under reference conditions $m_{AIR\_REF}$ (i.e. at a temperature of 298° K and a pressure of one atmosphere);

n speed of the internal combustion engine 1;

$E_{det}$ knocking energy (preferably defined by the difference between the combustion noise, determined through suitable processing of a microphone or accelerometer signal in an angular detection window close to the top dead TDC point, and a limit combustion noise corresponding to the ninety-eighth percentile of non-knocking combustion cycles and provided by a map stored inside the ECU electronic control unit, depending on the engine point and the cylinder 2);

$E_{det\text{-}obj}$ limit value of the knocking energy determined according to the engine point;

MAPO maximum amplitude (Maximum Amplitude Pressure Oscillation) of the intensity of the pressure waves generated by the combustion in the cylinders 2;

$MAPO_{obj}$ limit value of the maximum amplitude of the intensity of the pressure waves generated by the combustion in the cylinders 2 determined according to the engine point;

MFB50 combustion index (50% Mass Fraction Burnt) representing the engine angle (i.e. the crank angle) where, inside the cylinder 2, 50% of the fuel mass has been burnt;

SA spark advance angle; and $SA_{obj}$ objective value of the spark advance angle to be operated.

The $R_{EGR}$ quantity (or ratio) indicating (representing) the incidence of the low-pressure EGR circuit $EGR_{LP}$ on the gas mixture flowing in the intake duct 6 is also defined as follows:

$$R_{EGR}=M_{EGR\_LP}/M_{TOT}$$

$M_{TOT}$ mass of the gas mixture flowing in the intake duct 6 calculated as the sum of the mass of fresh air $M_{AIR}$ coming from the external environment flowing in the intake duct 6 and the mass of exhaust gas $M_{EGR\_LP}$ recirculated through the low-pressure circuit $EGR_{LP}$ flowing in the intake duct 6; and $M_{EGR\_LP}$ mass of exhaust gas recirculated through the low-pressure circuit $EGR_{LP}$ flowing in the intake duct 6.

In the description below, the $R_{EGR}$ quantity (for example used in the combustion model, as better described in the description below) can be alternatively determined through any one of the methods described in documents EP-A1-3040541, EP-B1-3128159, IT2016000115146, IT2016000115205 or through an outflow model of the EGR valve 16.

Figure 2:
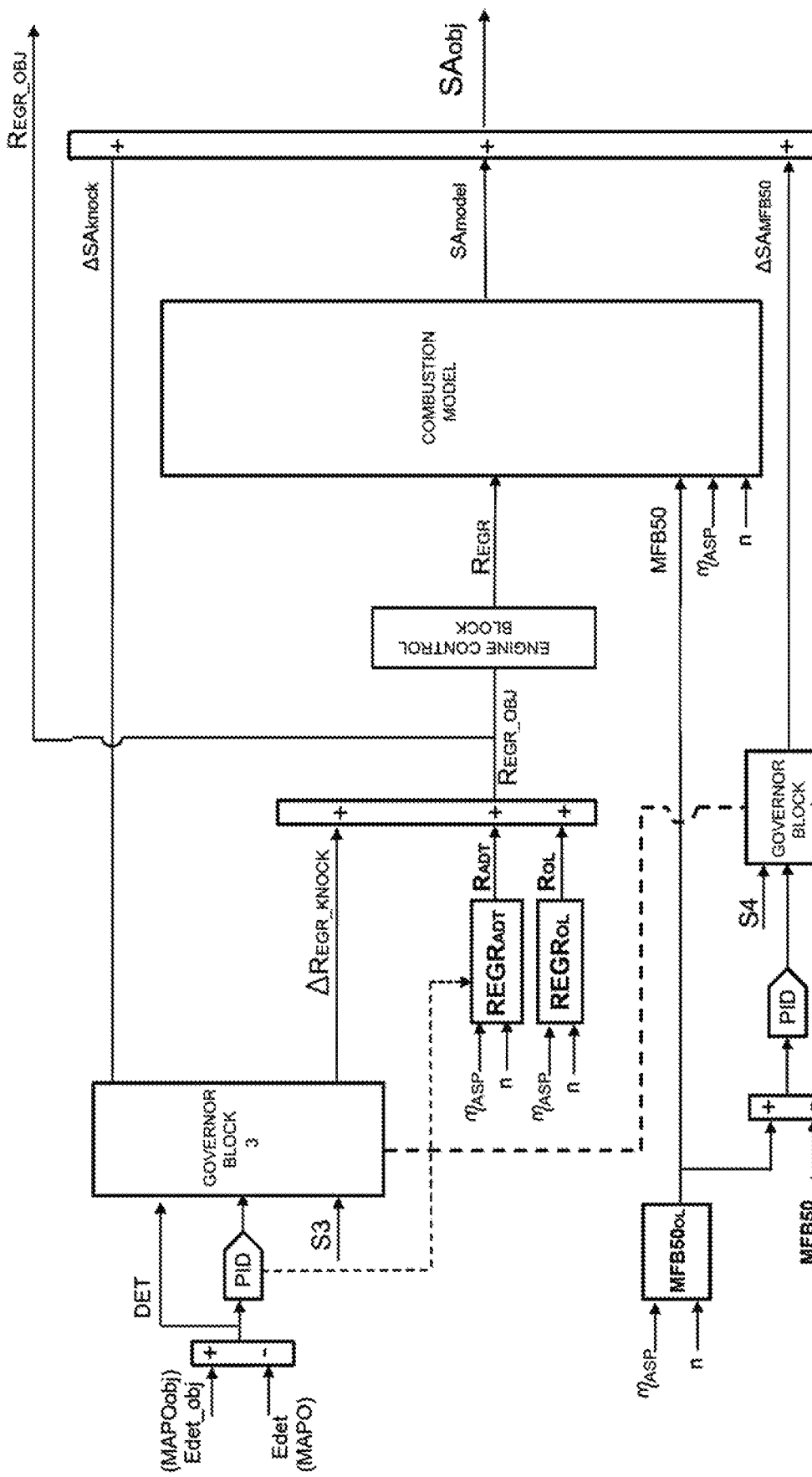
FIG. 2 is a block diagram representing the combustion control strategy implemented by an engine control unit of FIG. 1.

In greater detail, as illustrated in FIG. 2, the $R_{EGR}$ quantity represents the direct measurement or the estimate of the incidence of the gas flow from the low-pressure circuit $EGR_{LP}$ with respect to the (total) gas mixture flowing in the intake duct 6; the gas flow from the low-pressure circuit $EGR_{LP}$ is defined by the position of the EGR valve 16 and the conditions of the internal combustion engine 1 (in particular, pressure, temperature); the position of the EGR valve 16 is determined by the engine control unit according to an objective value of the $R_{EGR\_OBJ}$ quantity (or ratio) which is calculated as illustrated below. In an alternative form, the $R_{EGR}$ quantity is determined (estimated) as a function of the objective value of the $R_{EGR\_OBJ}$ quantity (for example, by filtering the objective value of the $R_{EGR\_OBJ}$ quantity by means of a first order filter).

As illustrated in FIG. 2, the combustion model used calculates the spark advance $SA_{model}$ as a function of the (known) intake efficiency $\eta_{ASP}$, the (known) speed n of the internal combustion engine 1, the combustion index MFB50 and the $R_{EGR}$ quantity. In other words, the combustion model that calculates the spark advance $SA_{model}$ can be expressed as follows:

$$SA_{model}=f(MFB50,\eta_{ASP},n,R_{EGR})$$

According to a first embodiment, the combustion model can be expressed by means of a parabola formulated as follows:

$$SA_{model}=a_2*MFB50^2+a_1*MFB50+a_0$$

wherein $SA_{model}$ and MFB50 take the meaning introduced previously, whereas the $a_i$ coefficients can be expressed as follows:

$$a_i=f_i(\eta_{ASP},n)*k_i(R_{EGR},\eta_{ASP}) \;[i=0,1,2]$$

wherein $R_{EGR}$, n and $\eta_{ASP}$ take the meaning introduced previously. The n and $\eta_{ASP}$ values are known to the electronic control unit.

Whereas $f_i$ and $k_i$ represent maps experimentally set up in a preliminary phase, which can change in relation to $\eta_{ASP}$, n, $R_{EGR}$.

According to a second embodiment, the combustion model can be expressed by means of a parabola formulated as follows:

$$SA_{model}=a_5*MFB50^2+a_4*MFB50+a_3+f_{EGR}(R_{EGR},\eta_{ASP})$$

wherein $SA_{model}$ and MFB50 take the meaning introduced previously, whereas the a coefficients can be expressed as follows:

$$a_i=f_i(\eta_{ASP},n) \;[i=3,4,5]$$

wherein $R_{EGR}$, n and $\eta_{ASP}$ take the meaning introduced previously. The n and $\eta_{ASP}$ values are known to the electronic control unit; $f_i$ represents a map experimentally set up in a preliminary phase, which can change in relation to the $a_i$ coefficients.

The $f_{EGR}$ function also represents a map experimentally set up in a preliminary phase, which can change in relation to the $R_{EGR}$ and $\eta_{ASP}$ quantities.

According to a third embodiment, the combustion model can be expressed as follows:

$$SA_{model}=MFB50+f_6(\eta_{ASP},n)+f_7(R_{EGR},\eta_{ASP})*f_9(\eta_{ASP},n)$$

wherein $SA_{model}$, MFB50, $R_{EGR}$, n and $\eta_{ASP}$ take the meaning introduced previously, and the n and $\eta_{ASP}$ values are known to the electronic control unit.

The $f_6$ and $f_8$ functions represent maps experimentally set up in a preliminary phase, which can change in relation to the n e $\eta_{ASP}$ quantities.

The $f_7$ function also represents a map experimentally set up in a preliminary phase, which can change in relation to the $R_{EGR}$ and $\eta_{ASP}$ quantities.

It is now described how to determine the combustion index MFB50 and the $R_{EGR\_OBJ}$ quantity.

The combustion index MFB50 is determined by means of an open-loop contribution; in particular, an $MFB50_{OL}$ map is stored inside the ECU electronic control unit, which map, depending on the intake efficiency $\eta_{ASP}$ and the speed n of the internal combustion engine 1, provides the combustion index MFB50.

The quantity $R_{EGR\_OBJ}$ is instead determined by adding up an open-loop contribution and a closed-loop contribution (i.e. in feedback).

The open-loop contribution provides a quantity $R_{EGR\_OL}$; in particular, an $REGR_{OL}$ map is stored inside the ECU electronic control unit, which map, depending on the intake efficiency $\eta_{ASP}$ and the speed n of the internal combustion engine 1, provides the $R_{EGR\_OL}$ quantity.

According to a first variant, the closed-loop contribution of the $R_{EGR\_OBJ}$ quantity is obtained by comparing the knocking energy $E_{det}$ of the combustion cycle that just took place with the limit value $E_{det-obj}$ of the knocking energy.

Alternatively, the closed-loop contribution of the $R_{EGR\_OBJ}$ quantity is obtained by comparing the maximum amplitude MAPO of the intensity of the pressure waves generated by the combustion in the cylinders 3 with the limit value $MAP_{obj}$ of the maximum amplitude of the intensity of the pressure waves generated by the combustion in the cylinders 3.

The type of control to be implemented is differentiated according to the outcome of the comparison between the knocking energy $E_{det}$ of the combustion cycle that just took place and the limit value $E_{det-obj}$ of the knocking energy (or, respectively, of the comparison between the maximum amplitude MAPO of the intensity of the pressure waves generated by the combustion in the cylinders 3 and the limit value $MAPO_{obj}$ of the maximum amplitude of the intensity of the pressure waves generated by the combustion in the cylinders 3); for example, the type of control is done by differentiating the intervention constants of a PID (or PI) regulator.

In particular, the strategy comprises a governor block which receives, as input, the contribution calculated through the difference between the knocking energy $E_{det}$ of the combustion cycle that just took place and the limit value $E_{det-obj}$ of the knocking energy (or, respectively, the difference between the maximum amplitude MAPO of the intensity of the pressure waves generated by the combustion in the cylinders 3 and the limit value $MAPO_{obj}$ of the maximum amplitude of the intensity of the pressure waves generated by the combustion in the cylinders 3), multiplied by the respective intervention constant of the PID regulator. Depending on the value of said contribution, the governor block 3 decides how to intervene to reduce the risk of knocking. In particular, if the contribution is lower than a threshold value S3 (preferably adjustable and changeable according to the engine point), this means that a reduced correction is required in order to avoid the occurrence of knocking phenomena. In this case, the governor block 3 calculates a differential of the $\Delta R_{EGR-KNOCK}$ quantity, which is suited to avoid the occurrence of knocking phenomena.

If, on the other hand, the contribution exceeds the threshold value S3, this means that a significant correction is required in order to avoid the occurrence of knocking phenomena. In this case, the governor block calculates a differential of the spark advance $\Delta SA_{KNOCK}$, which is suited to avoid the occurrence of knocking phenomena. In this case, as better described in the description below, the $R_{EGR-OBJ}$ quantity is rounded to a limit value.

Lastly, if knocking events (DET) are detected, the contribution is immediately rounded to a maximum value without waiting for the response of the PID regulator, so that the governor block 3 calculates a differential of the spark advance $\Delta SA_{KNOCK}$ which is suited to avoid the occurrence of knocking phenomena.

A preferred variant comprises a further open-loop contribution which provides an adaptive quantity $R_{EGR-ADT}$; in particular, a map is stored inside the ECU electronic control unit, which map, depending on the intake efficiency $\eta_{ASP}$ and the speed n of the internal combustion engine 1, provides the adaptive quantity $R_{EGR-ADT}$. Preferably, the said $REGR_{ADT}$ map is updated according to the integral part of the PID or PI controller used in the closed-loop contribution to determine the differential of the $\Delta R_{EGR-KNOCK}$ quantity in stationary conditions.

The $R_{EGR\_OBJ}$ quantity is therefore determined by adding the two open-loop contributions $R_{EGR-ADT}$ (if present) and $R_{EGR-OL}$ and the closed-loop contribution $\Delta R_{EGR-KNOCK}$.

The strategy also comprises a closed-loop contribution to optimize efficiency. In particular, the said closed-loop contribution is achieved by comparing the combustion index MFB50, determined by means of the open-loop contribution, and an estimated value of the combustion index $MFB50_{est}$.

The type of control to be implemented is differentiated according to the outcome of the comparison between the combustion index MFB50 and the estimated value of the combustion index $MFB50_{est}$; for example, the type of control is done by differentiating the intervention constants of a PID (or PI) regulator.

In particular, the strategy comprises a governor block which receives, as input, the contribution calculated through the difference between the combustion index MFB50 (or, more precisely, the open-loop combustion index $MFB50_{OL}$) and the estimated value of the combustion index $MFB50_{est}$, multiplied by the intervention constants of the PID or PI regulator. Depending on the value of said contribution, the governor block 4 decides how to intervene to optimise the efficiency of the internal combustion engine 1. In particular, if the contribution is higher than a threshold value S4 (preferably adjustable and changeable according to the engine point), this means that a significant correction is required in order to optimise the efficiency of the internal combustion engine 1. In this case, the governor block 4 calculates a differential of the spark advance $\Delta SA_{MFB50}$, which is suited to optimise the efficiency of the internal combustion engine 1.

Clearly, in this case too, in order to control the knocking and avoid the occurrence of knocking phenomena, the differential of the spark advance $\Delta SA_{KNOCK}$ reduces the spark advance $SA_{model}$ provided by the combustion model. On the contrary, to optimise the efficiency of the internal combustion engine 1, the differential of the spark advance $\Delta SA_{MFB50}$ increases the spark advance $SA_{model}$ provided by the combustion model. The protection of the internal combustion engine 1 in order to avoid the occurrence of knocking phenomena is preferred over the efficiency of the internal combustion engine 1; therefore, the differential of the spark advance $\Delta SA_{MFB50}$, which is suited to optimise the efficiency of the internal combustion engine 1, is zeroed (or drastically reduced) when the differential of the spark advance $\Delta SA_{KNOCK}$, which is suited to avoid the occurrence of knocking phenomena, intervenes to reduce the spark advance $SA_{model}$ provided by the combustion model. In other words, the strategy comprises zeroing (or rounding to a value close to zero) the differential of the spark advance $\Delta SA_{MFB50}$ as soon as the differential of the spark advance $\Delta SA_{KNOCK}$ starts to reduce the spark advance value $SA_{model}$ provided by the combustion model.

The objective advance $SA_{obj}$ to be implemented is therefore obtained through the sum of two different contributions: the spark advance $SA_{model}$ provided by the combustion model and the differential of the spark advance $\Delta SA_{MFB50}$, which is suited to optimise the efficiency of the internal combustion engine 1, or alternatively, the differential of the spark advance $\Delta SA_{KNOCK}$, which is suited to avoid the occurrence of knocking phenomena.

As anticipated in the foregoing discussion, the intake efficiency $\eta_{ASP}$ can be alternatively replaced by the indicated average pressure or the indicated driving torque or the driving brake torque or, generally, by any quantity representing the engine load.

The above-described combustion control method has many advantages as it can be easily implemented since it does not require a high computational burden, is robust and above all allows the presence of water on board the vehicle to be avoided without compromising the thermodynamic efficiency, at the same time allowing the occurrence of knocking phenomena to be avoided in a reliable manner.

The invention claimed is:

1. A method to control the combustion of an internal combustion engine (1) comprising a number of cylinders (3) and a low-pressure EGR circuit ($EGR_{LP}$); the method comprises the steps of:
    acquiring the rotation speed (n) and the intake efficiency ($\eta_{ASP}$) of the internal combustion engine (1);
    determining a first open-loop quantity ($R_{EGR-OL}$) representing the incidence of the low-pressure EGR circuit ($EGR_{LP}$) on the gas mixture flowing in an intake duct (6) depending on the rotation speed (n) and the intake efficiency ($\eta_{ASP}$);
    determining a first closed-loop quantity ($\Delta R_{EGR-KNOCK}$) representing the incidence of the low-pressure EGR circuit ($EGR_{LP}$) on the gas mixture flowing in the intake duct (6) depending on a quantity ($E_{det}$, MAPO) indicating a knocking energy;
    calculating the objective value ($R_{EGR-obj}$) of said quantity representing the incidence of the low-pressure EGR circuit ($EGR_{LP}$) on the gas mixture flowing in the intake duct (6) through the sum of the first open-loop quantity ($R_{EGR-OL}$) and the first closed-loop quantity ($\Delta R_{EGR-KNOCK}$);
    determining a quantity ($R_{EGR}$) representing the incidence of the low-pressure EGR circuit ($EGR_{LP}$) on the gas mixture flowing in an intake duct (6) depending on the objective value ($R_{EGR-obj}$) of said quantity;
    determining an open-loop combustion index (MFB50) representing the engine angle where, inside the cylinder, 50% of the fuel mass was burnt depending on the rotation speed (n) and the intake efficiency ($\eta_{ASP}$);
    determining, in a designing phase, a combustion model providing a spark advance value ($SA_{model}$) depending on said quantity ($R_{EGR}$), rotation speed (n), intake efficiency ($\eta_{ASP}$) and open-loop combustion index (MFB50);
    calculating a first closed-loop spark advance ($\Delta SA_{MFB50}$), which is suited to optimize the efficiency of the internal combustion engine (1), depending on the open-loop combustion index (MFB50);
    calculating a second closed-loop spark advance ($\Delta SA_{KNOCK}$), which is suited to avoid the occurrence of knocking phenomena, depending on a quantity ($E_{det}$, MAPO) indicating the knocking energy; and
    calculating the objective value ($SA_{obj}$) of the spark advance angle to be operated through the sum of the spark advance value ($SA_{model}$) provided by the combustion model, of the first closed-loop spark advance ($\Delta SA_{MFB50}$) and of the second closed-loop spark advance ($\Delta SA_{KNOCK}$).

2. The method according to claim 1, wherein the second closed-loop spark advance ($\Delta SA_{KNOCK}$) reduces the spark advance value ($SA_{model}$) provided by the combustion model, and the first closed-loop spark advance ($\Delta SA_{MFB50}$) increases or reduces the spark advance value ($SA_{model}$) provided by the combustion model; the method further including the step of zeroing to the current value the first closed-loop spark advance ($\Delta SA_{MFB50}$) when the second closed-loop spark advance ($\Delta SA_{KNOCK}$) starts reducing the spark advance value ($SA_{model}$) provided by the combustion model.

3. The method according to claim 1 and comprising the further steps of:
    determining a second open-loop quantity ($R_{EGR-ADT}$) depending on the rotation speed (n) and the intake efficiency ($\eta_{ASP}$) of the integral part of a PID/PI controller used in the first closed-loop quantity ($\Delta R_{EGR-KNOCK}$) in stationary conditions; and
    calculating the objective value ($R_{EGR-obj}$) of said quantity through the sum of the first open-loop quantity ($R_{EGR-OL}$), of the second open-loop quantity ($R_{EGR-ADT}$) and of the first closed-loop quantity ($\Delta R_{EGR-KNOCK}$).

4. The method according to claim 1, wherein the quantity ($E_{det}$, MAPO) indicating the knocking energy used to determine the second closed-loop spark advance ($\Delta SA_{KNOCK}$) is the knocking energy ($E_{det}$) defined by the difference between the combustion noise and a limit value of the combustion noise.

5. The method according to claim 1, wherein the quantity ($E_{det}$, MAPO) indicating the knocking energy used to determine the second closed-loop spark advance ($\Delta SA_{KNOCK}$) is the maximum amplitude (MAPO) of the intensity of the pressure waves generated by the combustion in the cylinders (3).

6. The method according to claim 1 and comprising the further steps of:
    calculating the difference between the quantity ($E_{det}$, MAPO) indicating the knocking energy of the combustion cycle that just took place and a respective limit value of the knocking energy; and
    determining the first closed-loop quantity ($\Delta R_{EGR-KNOCK}$) in case said difference or said contribution is smaller than a first threshold value (S3);
    determining the second closed-loop spark advance ($\Delta SA_{KNOCK}$) in case said difference or said contribution is greater than or equal to the first threshold value (S3).

7. The method according to claim 6, wherein said difference is multiplied by intervention constants of a PID regulator, which are variable depending on the difference.

8. The method according to claim 6 and comprising the further step of rounding down the second closed-loop spark advance ($\Delta SA_{KNOCK}$) to a minimum value in case knocking events are detected.

9. The method according to claim 1, wherein the combustion model is expressed by means of a parabola formulated as follows:

$$SA_{model}=a_2*MFB50^2+a_1*MFB50+a_0$$

MFB50 combustion index;
$SA_{model}$ spark advance value provided by the combustion model.

10. The method according to claim 9 and wherein the $a_i$ coefficients are expressed as follows:

$$a_i=f_i(\eta_{ASP},n)*k_i(R_{EGR},\eta_{ASP}) \ [i=0,1,2]$$

$R_{EGR}$ quantity representing the incidence of the low-pressure EGR circuit ($EGR_{LP}$);
n rotation speed,
$\eta_{ASP}$ intake efficiency.

11. The method according to claim 1, wherein the combustion model is expressed by means of a parabola formulated as follows:

$$SA_{model}=a_5*MFB50^2+a_4*MFB50+a_3+f_{EGR}(R_{EGR},\eta_{ASP})$$

MFB50 combustion index;
$R_{EGR}$ quantity representing the incidence of the low-pressure EGR circuit ($EGR_{LP}$);
$\eta_{ASP}$ intake efficiency; and
$SA_{model}$ spark advance value provided by the combustion model.

12. The method according to claim 11 and wherein the $a_i$ coefficients are expressed as follows:

$$a_i=f_i(\eta_{ASP},n) \ [i=3,4,5]$$

n rotation speed; and
$\eta_{ASP}$ intake efficiency.

13. The method according to claim 1, wherein the combustion model is expressed as follows:

$$SA_{model}=MFB50+f_6(\eta_{ASP},n)+f_7(R_{EGR},\eta_{ASP})*f_9(\eta_{ASP},n)$$

MFB50 combustion index;
$R_{EGR}$ quantity representing the incidence of the low-pressure EGR circuit ($EGR_{LP}$);
$\eta_{ASP}$ intake efficiency;
n rotation speed; and
$SA_{model}$ spark advance value provided by the combustion model.

14. The method according to claim 1, wherein the second closed-loop spark advance ($\Delta SA_{KNOCK}$) reduces the spark advance value ($SA_{model}$) provided by the combustion model, and the first closed-loop spark advance ($\Delta SA_{MFB50}$) increases or reduces the spark advance value ($SA_{model}$) provided by the combustion model; the method further including the step of freezing to the current value the first closed-loop spark advance ($\Delta SA_{MFB50}$) when the second closed-loop spark advance ($\Delta SA_{KNOCK}$) starts reducing the spark advance value ($SA_{model}$) provided by the combustion model.

15. The method according to claim 1, wherein the second closed-loop spark advance ($\Delta SA_{KNOCK}$) reduces the spark advance value ($SA_{model}$) provided by the combustion model, and the first closed-loop spark advance ($\Delta SA_{MFB50}$) increases or reduces the spark advance value ($SA_{model}$) provided by the combustion model; the method further including the step of rounding up to the current value the first closed-loop spark advance ($\Delta SA_{MFB50}$) when the second closed-loop spark advance ($\Delta SA_{KNOCK}$) starts reducing the spark advance value ($SA_{model}$) provided by the combustion model.

* * * * *